United States Patent

Kubota et al.

[11] Patent Number: 5,247,733
[45] Date of Patent: Sep. 28, 1993

[54] COMPONENT ASSEMBLING APPARATUS

[75] Inventors: Hitoshi Kubota, Moriguchi; Hiroshi Nakagawa, Takatsuki; Toshitsugu Inoue, Tsuzuki; Akiyoshi Nakada, Suita; Manabu Yamane, Neyagawa; Hideki Tsutsumi, Joyo, all of Japan

[73] Assignee: Matsushita Electric Industrial Co., Ltd., Osaka, Japan

[21] Appl. No.: 924,934

[22] Filed: Aug. 5, 1992

[30] Foreign Application Priority Data

Aug. 7, 1991 [JP] Japan .................. 3-197618

[51] Int. Cl.$^5$ .............................................. B23P 21/00
[52] U.S. Cl. ...................................... 29/785; 29/787; 29/792; 29/795
[58] Field of Search ............... 29/771, 785, 787, 792, 29/795

[56] References Cited

U.S. PATENT DOCUMENTS 4,163,142  7/1979  Descovich et al. ............... 29/795
4,715,113  12/1987  Wickham ........................... 29/792
4,852,327  8/1989  Kurkowski et al. ............... 29/785

FOREIGN PATENT DOCUMENTS 0048541  4/1980  Japan ................................ 29/785
0143325  11/1980  Japan ................................ 29/792

Primary Examiner—Mark Rosenbaum
Assistant Examiner—Kenneth J. Hansen
Attorney, Agent, or Firm—Wenderoth, Lind & Ponack

[57] ABSTRACT

A component assembling apparatus includes an intermittently rotatable index table for holding a plurality of positioning tools for use in positioning components to be assembled, and an index table driving mechanism for intermittently rotating the index table. The apparatus also includes a component feeding device for feeding one of the components and holding the component at a removal position of the device, a tool container for storing the plurality of assembling tools for assembling the components, and an arm robot for removably securing one of the assembling tools at its end. The arm robot is operable to move the component from the removal position of the component feeding device to a predetermined position of the positioning tool on the table, and to assemble the component on the positioning tool. An arm robot driving mechanism is provided for actuating the arm robot and the assembling tool.

17 Claims, 22 Drawing Sheets

Fig. 1 - PRIOR ART

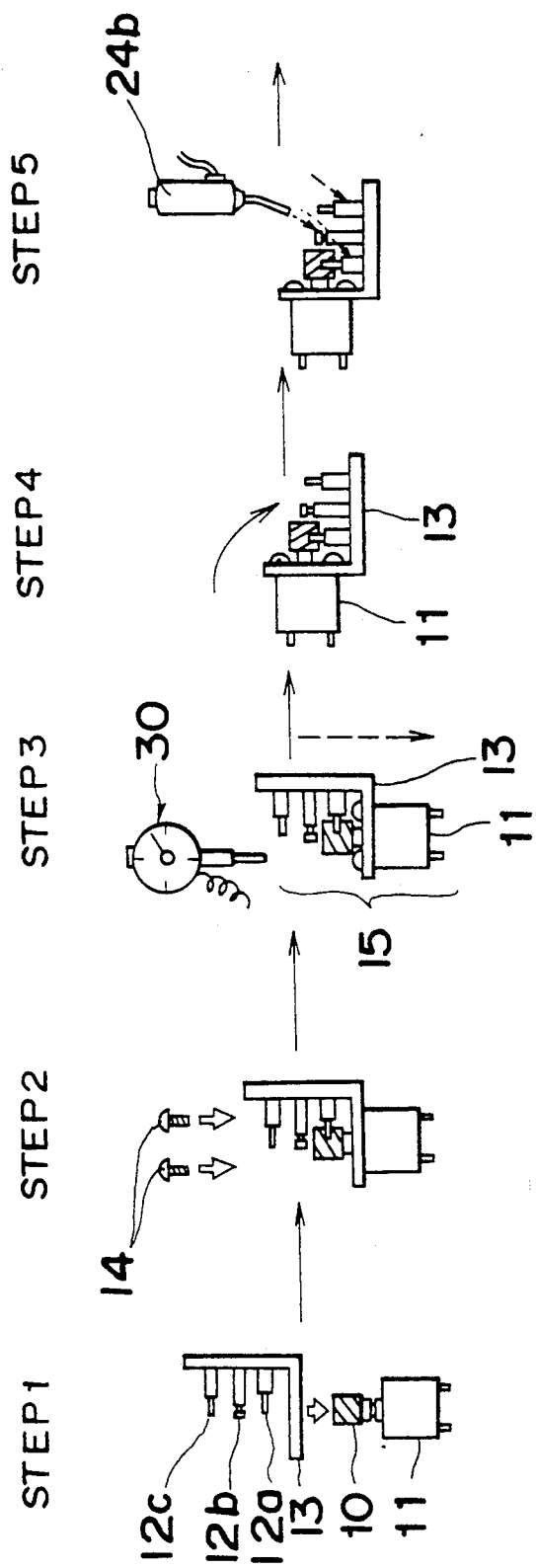

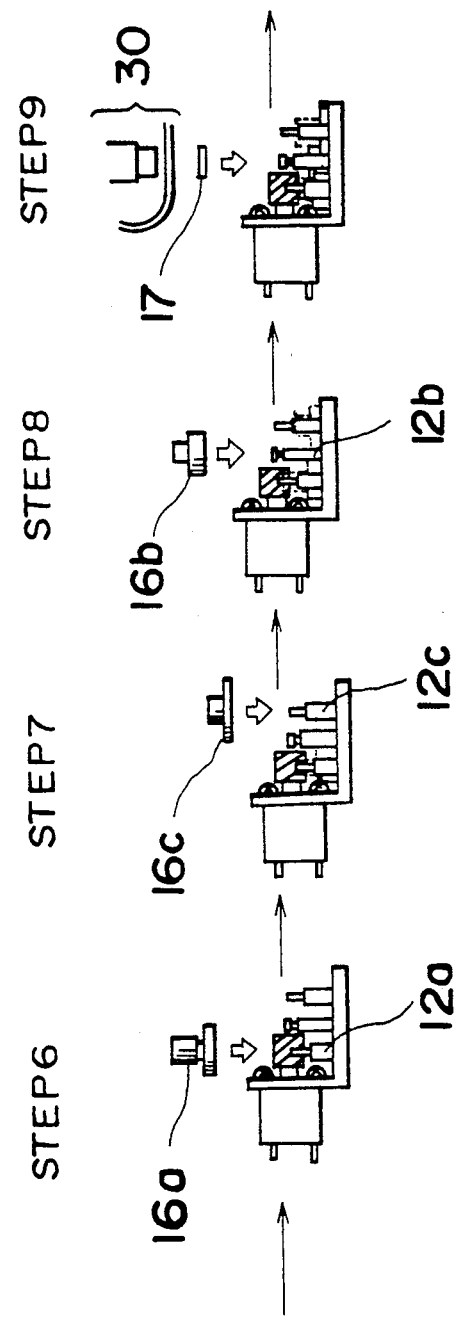

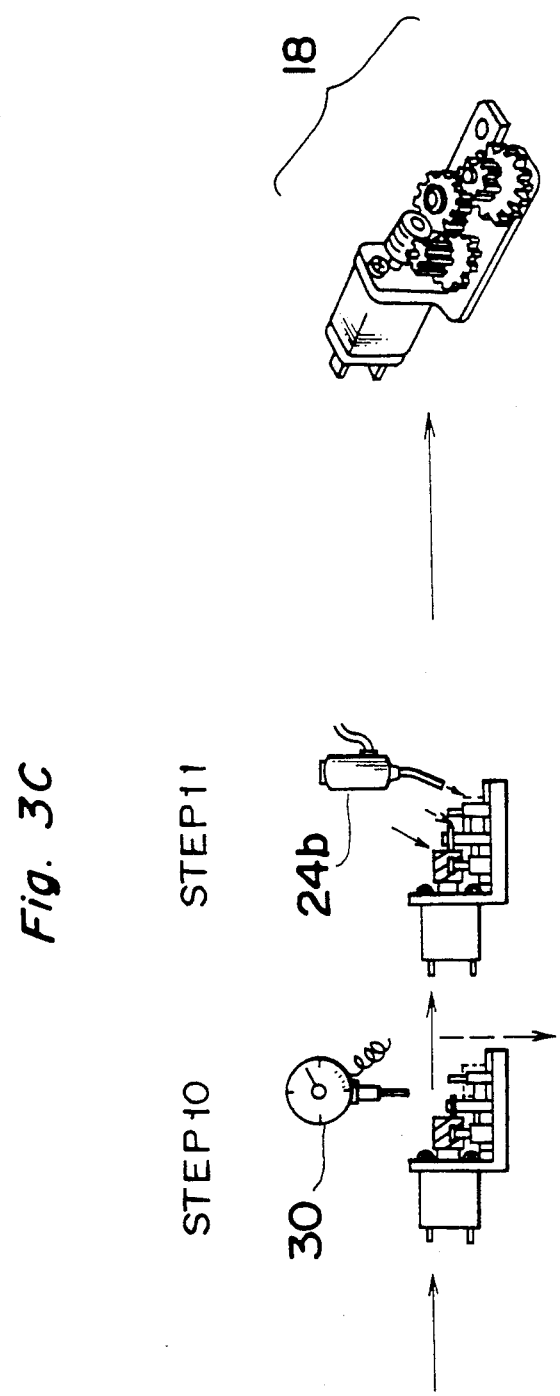

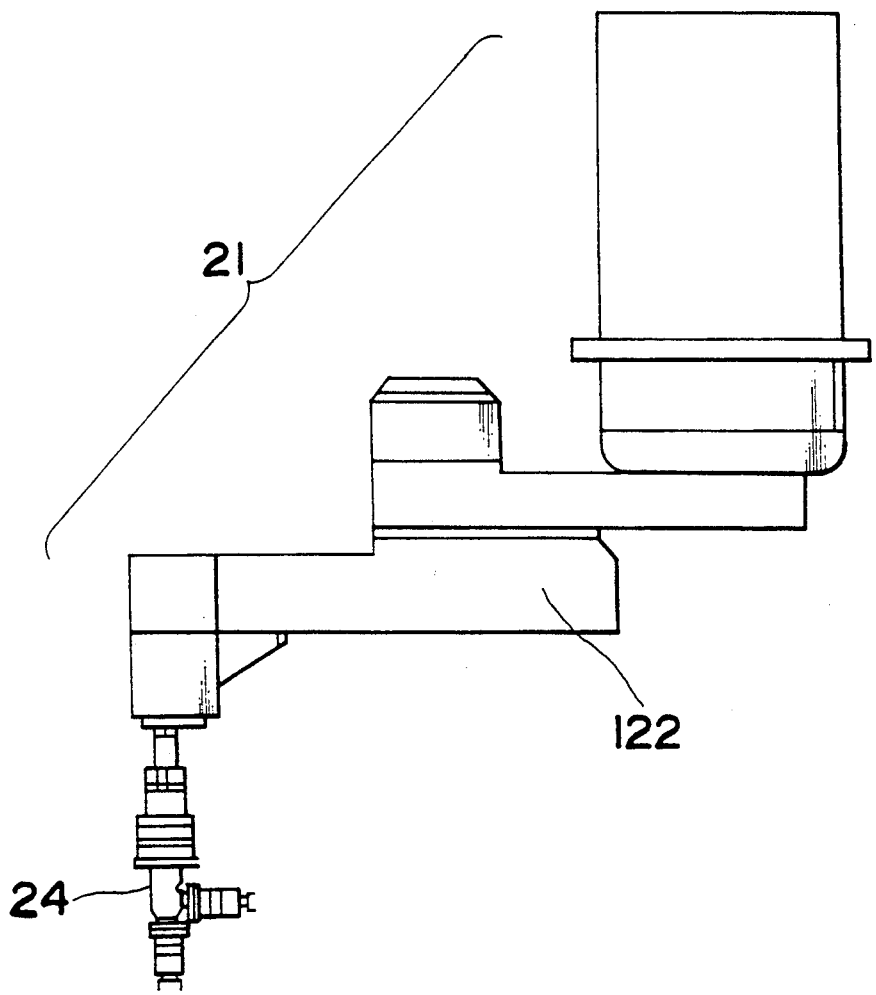

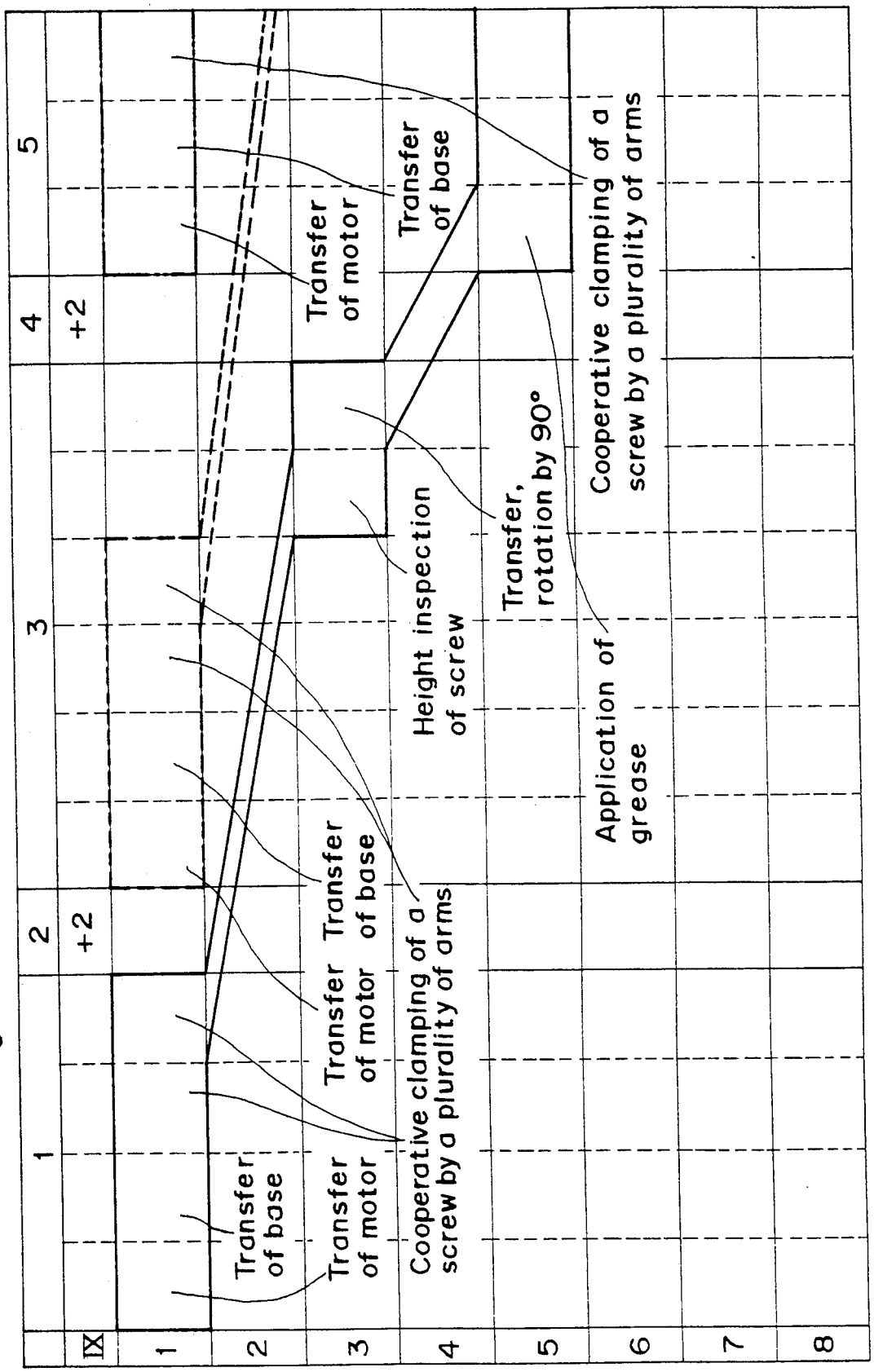

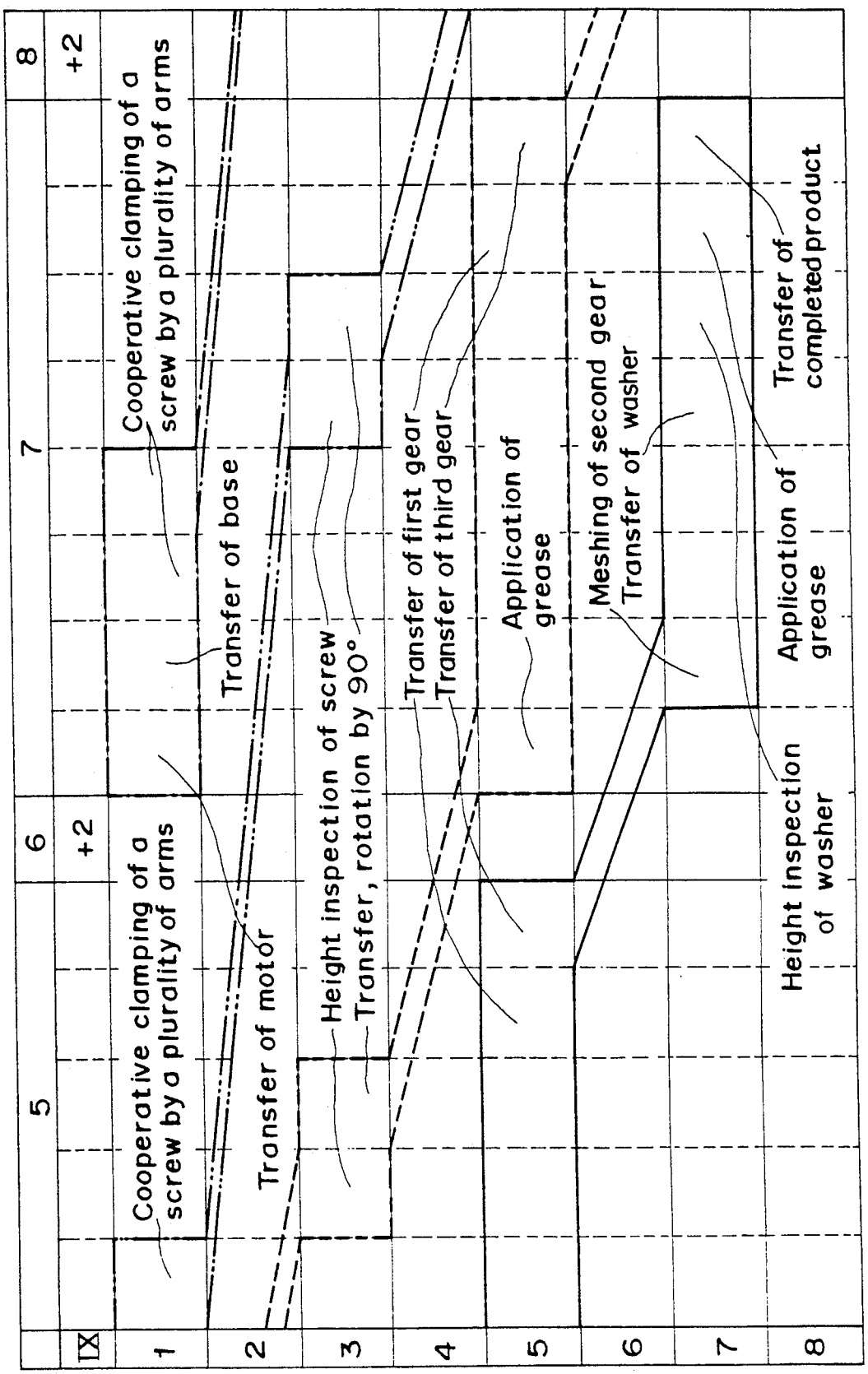

Fig. 12 C

| | 9 | | | | | | 10 |
|---|---|---|---|---|---|---|---|
| IX | | | | | | | +2 |
| 1 | | | | Cooperative clamping of a screw by a plurality of arms | | | |
| 2 | | | | Height inspection of screw | | | |
| 3 | Transfer of base Transfer of motor | | | | | Transfer, rotation by 90° | |
| 4 | | Transfer of first gear Transfer of third gear | | | | | |
| 5 | Application of grease | | | | | | |
| 6 | | Meshing of second gear Transfer of washer | | | | | |
| 7 | | | | | | | |
| 8 | | Height inspection of washer | | Transfer of compled product | | | |

Fig. 12D

| | 11 | | | | | | 12 |
|---|---|---|---|---|---|---|---|
| IX | | | | | | | +2 |
| 1 | | | | Cooperative clamping of a screw by a plurality of arms | | | |
| 2 | | | | Height inspection of screw | | | |
| 3 | Transfer of base / Transfer of motor | | | | | Transfer, rotation by 90° | |
| 4 | | | Transfer of first gear / Transfer of third gear | | | | |
| 5 | Application of grease | | | | | | |
| 6 | | | Meshing of second gear / Transfer of washer | | | | |
| 7 | | | | | | | |
| 8 | | Height inspection of washer | | | Transfer of compled product | | |

Fig. 12E

| | 13 | |
|---|---|---|
| IX | | |
| 1 | Cooperative clamping of a screw by a plurality of arms | |
| 2 | Height inspection of screw | |
| 3 | Transfer of base / Transfer of motor — Transfer, rotation by 90° | |
| 4 | Transfer of first gear / Transfer of third gear | |
| 5 | Application of grease | |
| 6 | Meshing of second gear / Transfer of washer | |
| 7 | | |
| 8 | Height inspection of washer / Transfer of compled product | |

COMPONENT ASSEMBLING APPARATUS

BACKGROUND OF THE INVENTION

The present invention generally relates to an assembling apparatus for assembling and simply processing components and, more particularly to a component assembling apparatus effective in use to produce a quantity of a new product which is too small in quantity to justify automation before the product is actually brought into full scale production on a commercial basis.

Conventionally, in manufacturing a new product, people must manually assemble the components before a quantity of sales of the product is expected which is sufficient to justify automation. Automation, including installation of robots, etc., is started only after good prospects for the sales of the product are offered. That is, mass production of the product is realized step by step.

Hereinbelow, a conventional component assembling apparatus for use in establishing a mass production system will be described with reference to FIG. 1.

FIG. 1 is a plan view of the conventional component assembling apparatus. In the drawing, a positioning tool 3 which positions and holds a component 2 is intermittently transferred by a tool transferring device 1. The stopping positions of the positioning tool 3 during the intermittent transfer thereof are arranged parallel to the transferring device 1 and corresponding to the positions of robots 4 which perform predetermined operations, respectively. Although each robot 4 performs a predetermined operation, the operation is fundamentally composed of one step or two to three steps of procedures at most. Therefore, the robots 4 are aligned sequentially in order from step 1 (S1) to step 11 (S11), in order to produce a product. At Step 1, a motor 11 is mounted to a base 13 formed of resin and having three pins 12a, 12b, 12c for use in mounting gears as shown in FIG. 2. A worm gear 10 is preliminarily pressed onto a main shaft of the motor 11. At Step 2, with the motor 11 mounted to the base 13, the assembled body is fixedly secured by two screws 14. At Step 3, the height of the head of each screw 14 is measured to determine whether each screw 14 is properly engaged. At Step 4, a unit 15 defined by the motor 11 and the base 13 (referred to as a base unit hereinafter) is rotated 90°. At Step 5, grease is applied to the three pins 12a, 12b, 12c of the base unit 15. At Step 6, one first gear 16a is mounted onto the mount pin 12a. At Step 7, a third gear 16c is mounted onto the mount pin 12c. At Step 8, a second gear 16b is mounted onto the pin 12b. At Step 9, a washer 17 is fixed over the second gear 16b so as to prevent detachment of the second gear 16b. At Step 10, the height of the washer 17 is detected so as to determine whether the washer 17 is properly mounted. At Step 11, grease is applied to each position at which the first to third gears 16a, 16b, 16c are meshed.

With the mass production system of the production line in the structure described above, it is difficult to meet the recent diversifying trend of consumers' tastes. It is not easy to switch the equipment to an expanded scale or a reduced scale or to convert it for a different use, but such switching and conversion is necessary because the life cycle of products has become considerably shortened and the product easily and quickly made to the commonplace these days. As such, the valuable automated system increasingly proves of no use.

SUMMARY OF THE INVENTION

The object of the present invention is therefore to provide a component assembling apparatus, with which the aforementioned disadvantages inherent in the conventional technique are eliminated, for which automation of production can be realized even in a stage where the quantity of production is small, and with which a production system can be established to allow for addition, reduction or conversion of the equipment step by step in correspondence with changes in the market.

In accomplishing these and other objects, according to a first aspect of the present invention, there is provided a component assembling apparatus comprising:

an intermittently rotatable index table for holding a plurality of positioning tools for positioning components to be assembled;

an index table driving means for intermittently rotating the index table;

a component feeding device for feeding one of the components and holding the component at a removal position of the device;

a tool container for storing the plurality of assembling tools for assembling the components;

an arm robot, having one of the assembling tools removably mounted at its end, for moving the component from the removal position of the component feeding device to a predetermined position of the positioning tool on the table, and for assembling the component on the positioning tool; and an arm robot driving means for actuating the arm robot.

In the structure set forth above, because of the presence of the index table for holding a plurality of positioning tools at predetermined positions, and an arm to be equipped, at its end, with one of the assembling tools, operations respectively composed of a plurality of steps can be carried out simultaneously for a plurality of objects. Moreover, since the tools are exchangeable, the component assembling apparatus is ready to meet the market situation, for example, when sales decrease so much that the production should be cut down.

According to a second aspect of the present invention, there is provided the component assembling apparatus described above in which plural arm robots are installed such that they can be shifted from a rotational center of the index table towards the component feeding device.

By the above construction of the present invention, since the distance of the plurality of arms is made changeable, the cooperative working area can be adjusted to attain the proper working circumstances.

According to a third aspect of the present invention, there is provided the component assembling apparatus described above which further comprises a transferring means for transferring an assembled component.

By the above construction of the present invention, if a plurality of the component assembling apparatus of the present invention are connected, and transferring means are arranged along the connected apparatuses, it becomes possible for each of the apparatuses to share a few of the assembly steps and therefore, the production scale can be easily enlarged to achieve mass production.

According to a fourth aspect of the present invention, there is provided a component assembling apparatus comprising:

an intermittently rotatable index table for holding a plurality of positioning tools for positioning components to be assembled;

an index table driving means for intermittently rotating the index table;

a component feeding device for feeding one of the components and holding the component at a removal position of the device;

a tool container for storing a plurality of assembling tools for assembling the components, the tool container being provided at a center of the index table;

a tool container driving means for vertically moving the tool container in a center hollow part of the index table;

a first arm robot for removably mounting one of the assembling tools at its end, for moving the component from the removal position of the component feeding device to a predetermined position of the positioning tool on the table, and for assembling the component on the positioning tool;

a first arm robot driving means for actuating the first arm robot;

a second arm robot for removably mounting one of the assembling tools at its end, and for moving the component from the removal position of the component feeding device to a predetermined position of the positioning tool on the table and assembling the component on the positioning tool, the first and second arm robots being arranged to cooperate with each other to perform an aimed operation for assembly; and a second arm robot driving means for actuating the second arm robot.

According to the construction of the present invention, since the plurality of the arms collaborate, the component assembling apparatus is convenient for the early production of a new product.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3A–3C are flow chart diagrams of the assembly of the motor unit;

FIG. 7A is a side sectional view of a holding hand of a first gear and a third gear as an example of a tool;

FIGS. 12A–12E are time charts showing an operation carried out in the working stations of the index table according to a third embodiment of the present invention.

DETAILED DESCRIPTION OF THE PREFERRED EMBODIMENTS

Figure 1:
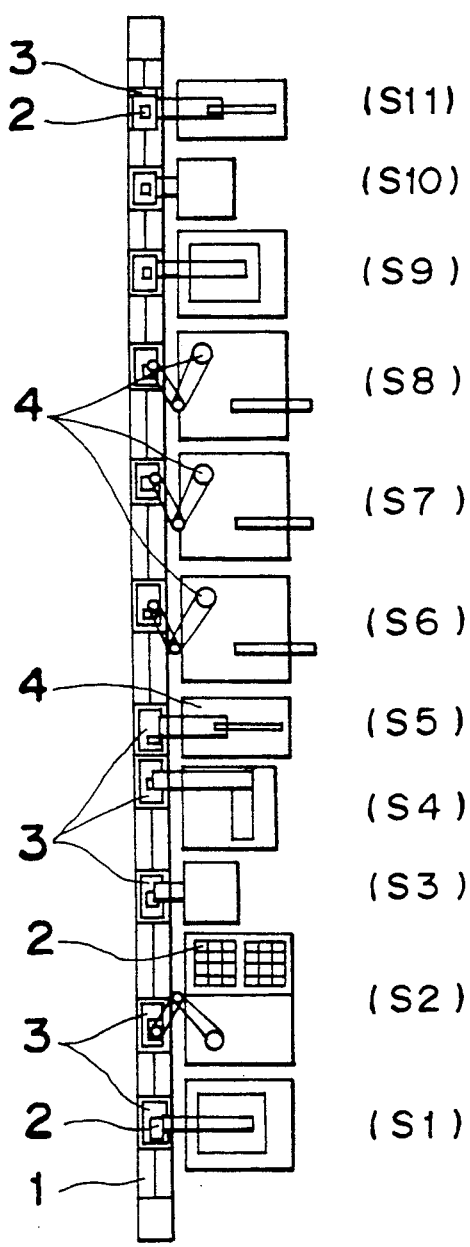
FIG. 1 is a plan view of a conventional component assembling apparatus.

Before the description of the present invention proceeds, it is to be noted that like parts are designated by like reference numerals throughout the accompanying drawings.

A component assembling apparatus of one embodiment of the present invention applied in assembling a motor unit as a driving source will be described hereinbelow.

Figure 2:
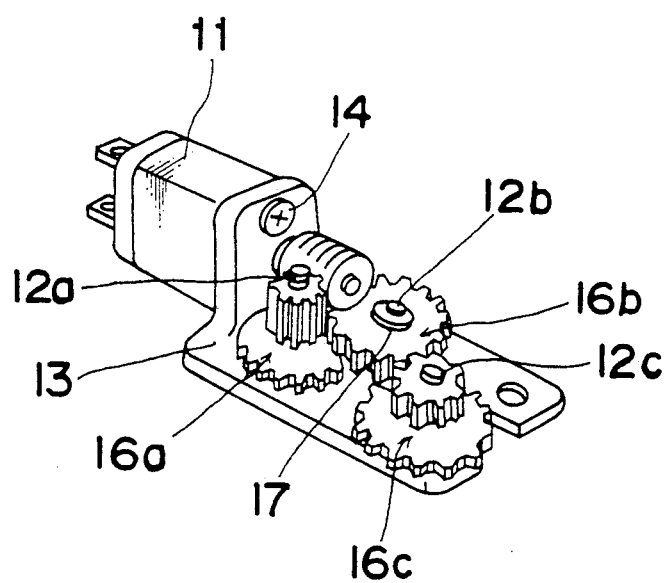
FIG. 2 is a view of a motor unit for use in explaining one embodiment of the present invention.

FIG. 2 is a view showing a motor unit, and FIGS. 3A–3C are flow charts of the assembly process for the motor unit. The assembly process for the motor unit will be discussed in detail with reference to FIGS. 2, 3A, 3B, and 3C. FIG. 3A shows the following Steps 1–5. FIG. 3B shows the following Steps 6–9. FIG. 3C shows the following Steps 10–11.

Step 1

A motor 11 is mounted to a base 13 formed of resin and having three pins 12a, 12b, 12c for mounting gears. A worm gear 10 is preliminarily pressed onto a main shaft of the motor 11.

Step 2

While the motor 11 is mounted to the base 13, the assembled body is fixedly secured by two screws 14.

Step 3

The height of the head of each screw 14 is measured to determine whether each screw 14 is properly secured.

Step 4

A unit 15 defined by the motor 11 and the base 13 (referred to as a base unit hereinafter) is rotated 90°.

Step 5

Grease is applied to the three pins 12a, 12b, 12c of the base unit 15.

Step 6

One first gear 16a is mounted onto the mount pin 12a.

Step 7

A third gear 16c is mounted onto the mount pin 12c.

Step 8

A second gear 16b is mounted onto the mount pin 12b.

Step 9

A washer 17 is fixed over the second gear 16b so as to prevent detachment of the second gear 16b.

Step 10

The height of the washer 17 is detected so as to determine whether the washer 17 is properly mounted.

Step 11

Grease is applied to each position at which the first to third gears 16a, 16b, 16c are meshed.

A motor unit 18 is completely assembled in the above-described process from Step 1 to Step 11.

The structure of the component assembling apparatus will be described below.

Figure 4:
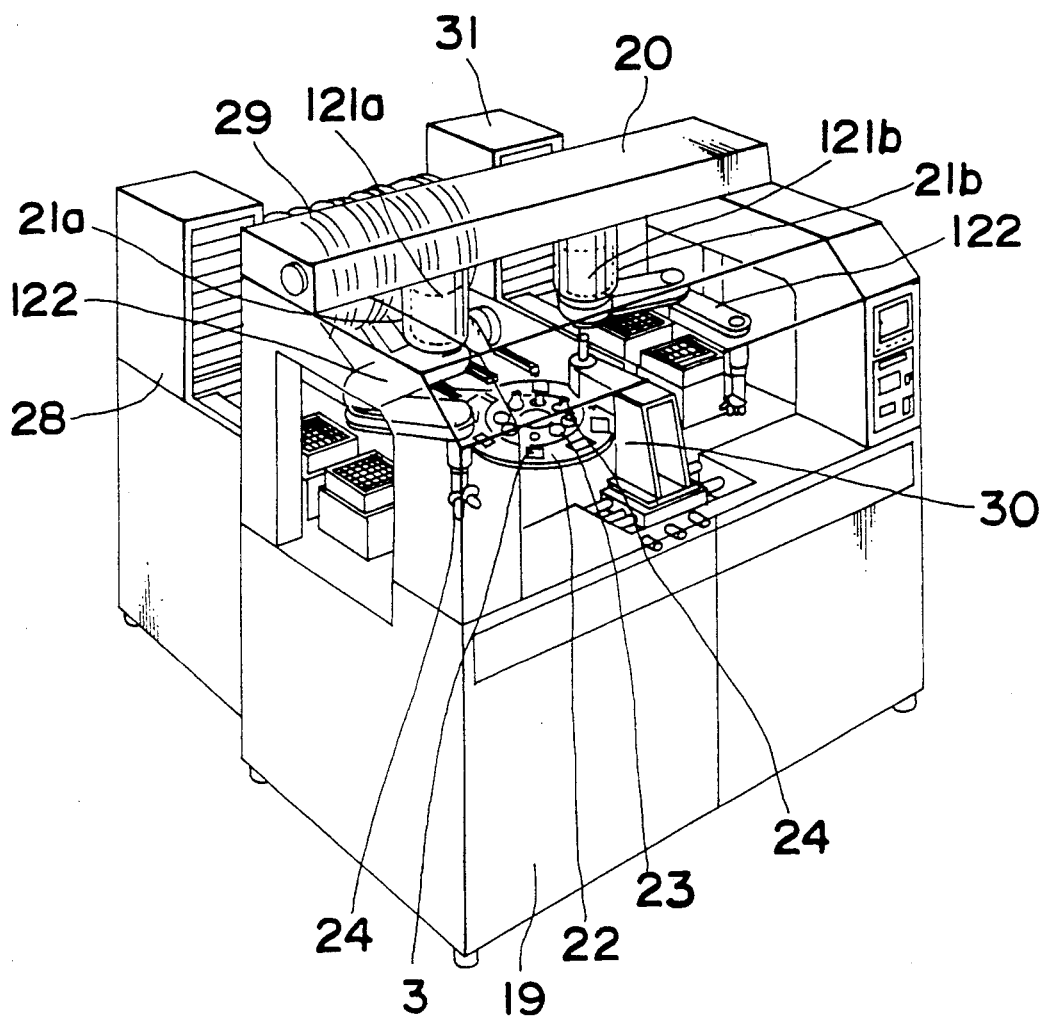
FIG. 4 is a perspective view showing the overall appearance of a component assembling apparatus according to the embodiment of the present invention.
Figure 5:
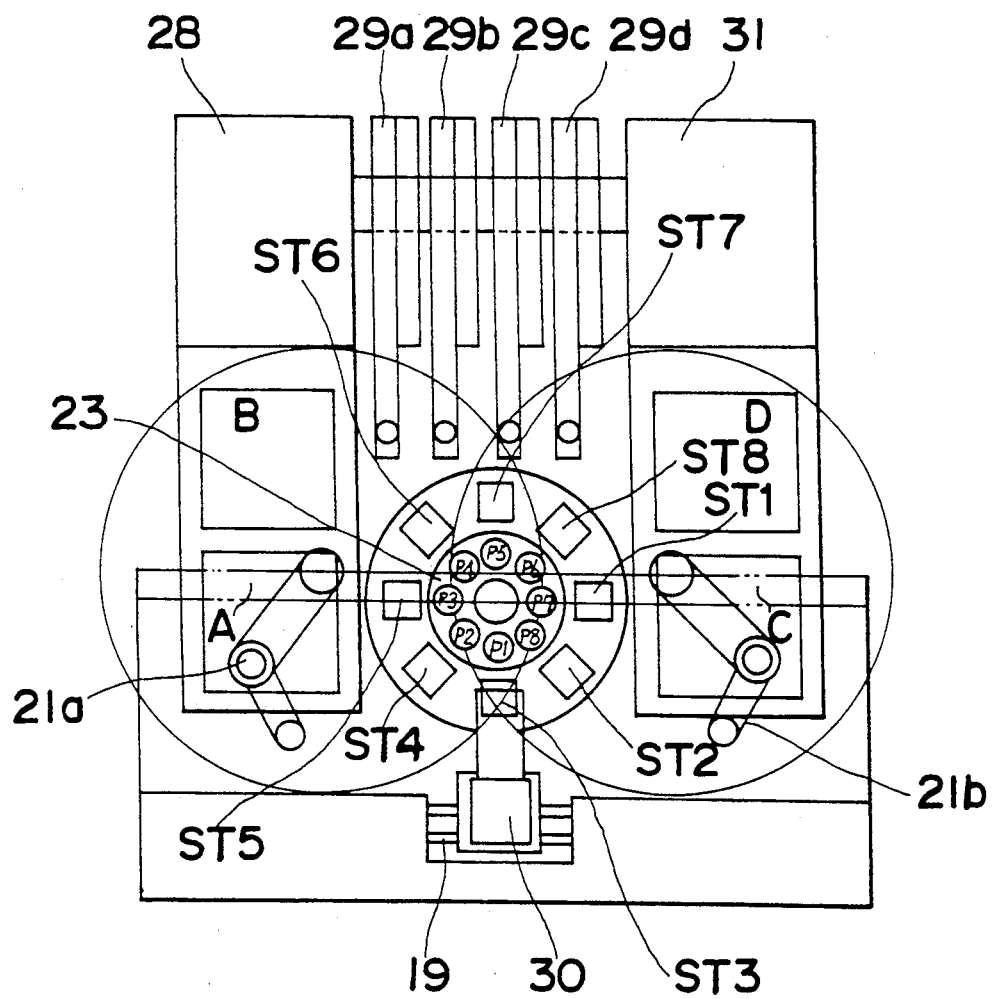
FIG. 5 is a plan view of the component assembling apparatus of FIG. 4.

FIG. 4 is a perspective view of the overall appearance of the component assembling apparatus according to one preferred embodiment of the present invention. FIG. 5 is a plan view of the component assembling apparatus of FIG. 4.

Referring to FIGS. 4 and 5, the component assembling apparatus has arm robots 21a, 21b which perform various kinds of operations. A tool 24 is automatically mounted to or detached from an arm 122 of each of first and second arm robots 21a, 21b. An end of the arm 122 is a chuck.

Driving sources 121a, 121b of the first and second arm robots 21a, 21b are mounted inwardly of the respective arms 122. The arm robots 21a, 21b and the tools attached to the arm robots 21a, 21b are driven by the driving sources 121a, 121b. A running lane 20 is fixed above a stage 19 of the apparatus main body for suspending a plurality of robots, namely, the arm robots 21a, 21b. A plurality of positioning tools (jigs) 3 (not shown) are held on a disk-shaped index table 22 so as to fixedly position the components. There are eight working stations (ST1-ST8) on the upper surface of the index table 22 (refer to FIG. 5). The index table 22 can be rotated both in a forward (clockwise) and in a reverse direction in the horizontal plane thereof.

Figure 6:
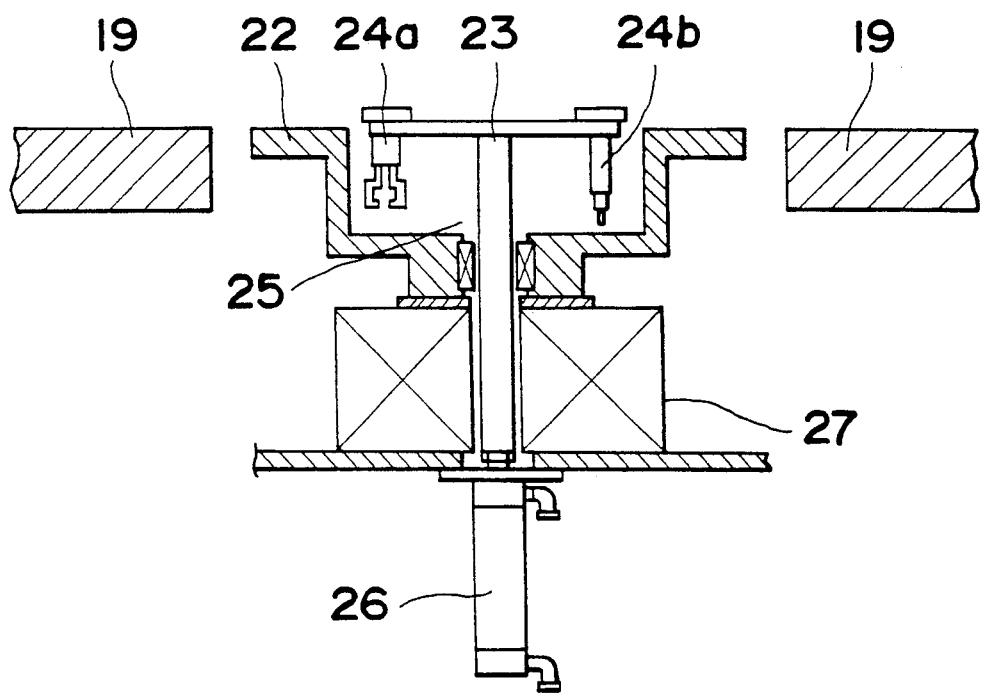
FIG. 6 is a cross-sectional view of an index table of the component assembling apparatus of FIG. 4.

FIG. 6 shows a schematic cross-sectional view of the index table 22.

A tool container 23 is capable of accommodating assembly tools such as, at most, a total of eight hands 24a for assembly and tools 24b, and is provided in a hollow section 25 at the central part around a rotary shaft of the index table 22.

Below the index table 22 is a cylinder 26 for moving the tool container 23 up and down. The index table 22 is operably connected for reversible rotation to a driving source 27.

Referring back to FIGS. 4 and 5, relatively large components are placed on a tray-type component feeding device 28 of the apparatus to be sent to a feed section A and a feed section B by the device 28. A taping component feeding device 29 supplies taping components in which components are supported on a tape. Taping cassettes 29a, 29b of the device 29 respectively feed the first and second gears 16a, 16b which are taping components of the first arm robot 21a. On the other hand, taping cassettes 29c, 29d respectively feed taping components of the second arm robot 21b in which components are supported on a tape, i.e., third gears 16c and screws 14. A processing device 30 punches a resin tape filled in the form of a hoop to cut the washer 17 from the tape, thereby supplying the washer 17. The processing device 30 also functions as an inspecting device to inspect the height of the screw 14. A finished product container 31 arranged in opposition to the feeding device 28 accommodates finished products in supply sections C and D.

Table 1 indicates the contents of the hands 24a and tools 24b accommodated in the tool container 23.

TABLE 1

|  | Tool, hand | Position |
|---|---|---|
| First Robot 21a | Motor holding hand | P1 |
|  | Base holding hand | P2 |
|  | 90° reversing hand | P3 |
|  | Holding hand for first and third gears | P4 |
| Second Robot 21b | Holding hand for second gear | P5 |
|  | Finished product | P6 |

TABLE 1-continued

| Tool, hand | Position |
|---|---|
| holding hand | |
| Screw clamping tool | P7 |
| Grease applying tool | P8 |

Table 2 shows the packing style and the accommodating position of each component.

TABLE 2

| Name of component | | Packing form | Position |
|---|---|---|---|
| First Robot 21a | Motor | Tray | A |
|  | Base | Tray | B |
|  | First Gear | Taping | 1 |
|  | Second Gear | Taping | 2 |
| Processing device | Cut washer | Hoop | - |
| Second Robot 21B | Completed product | Tray | C |
|  |  |  | D |
|  | Third Gear | Taping | 3 |
|  | Screw | Taping | 4 |

Figure 10A:
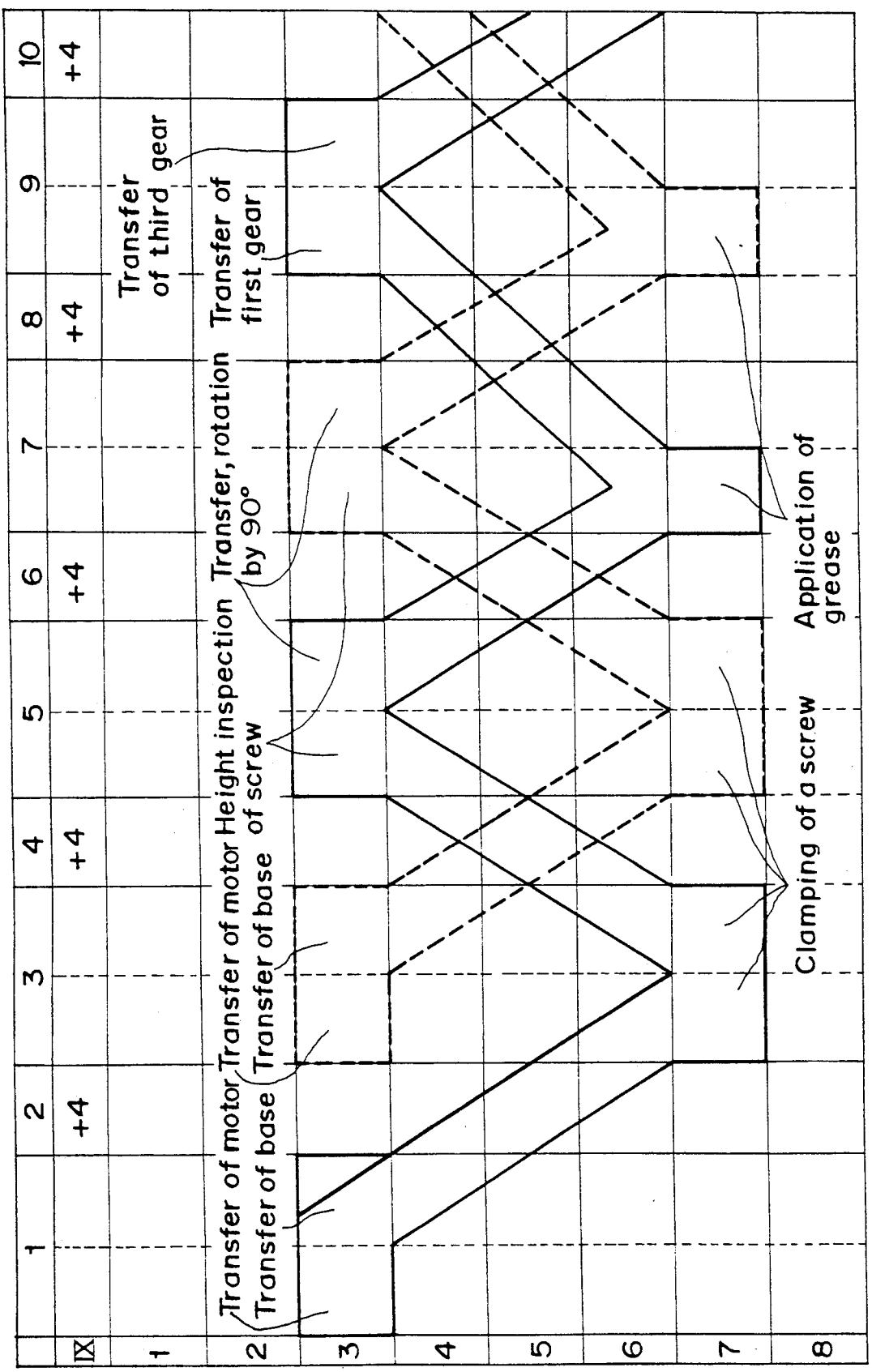
FIGS. 10A–10B are time charts showing an operation carried out in the working stations of the index table according to the embodiment.
Figure 10B:
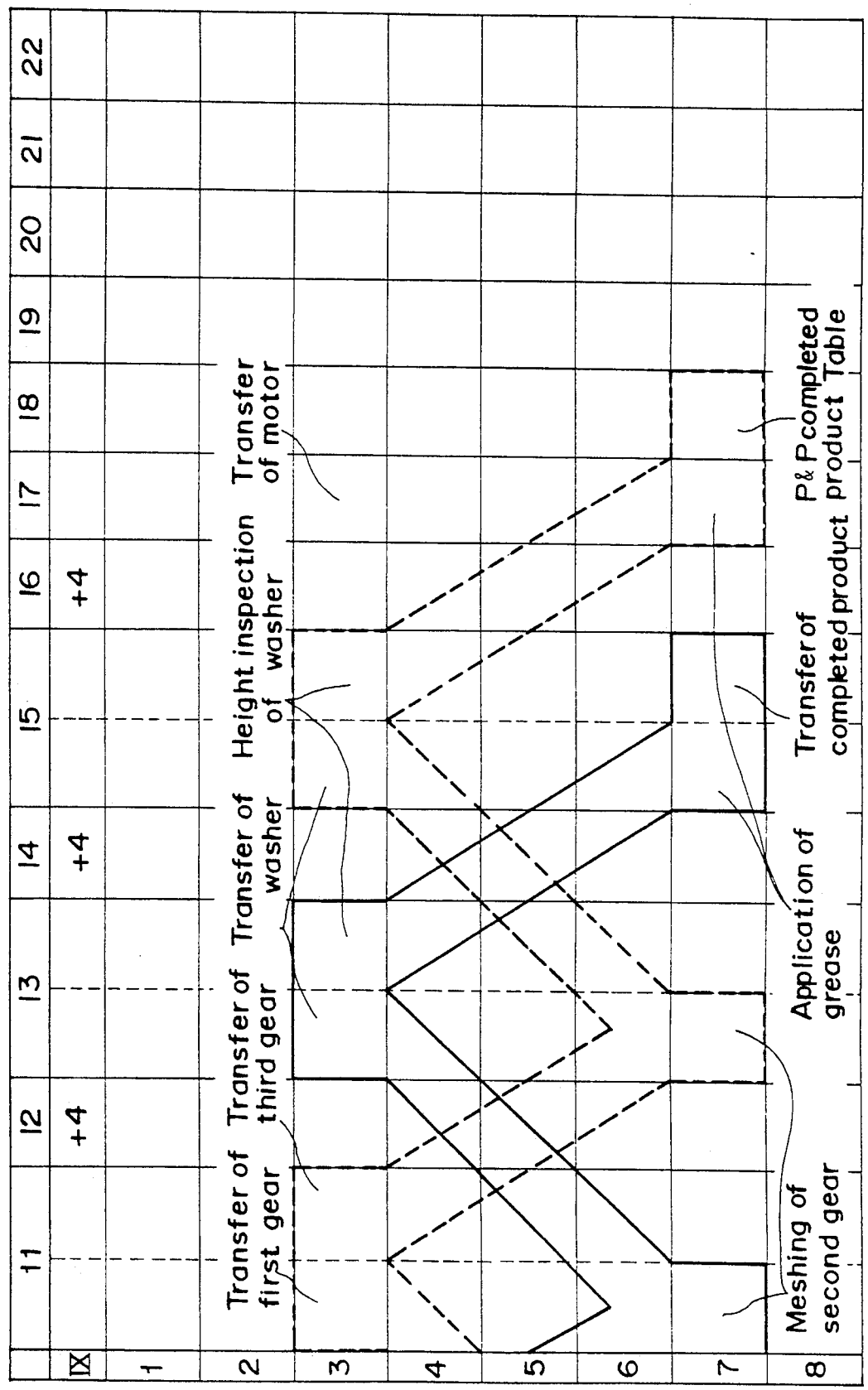

The assembling process in which the component assembling apparatus of the embodiment assembles a motor unit 18 will be depicted with reference to time charts shown in FIGS. 10A-10B.

In the time charts of FIGS. 10A-10B, numerals 1-8 along the ordinate axis represent working station (ST1-ST8) of the index table 22. The column of a fixed reference IX provides information regarding the rotation of the index table 22 relative to the stage 19. For example, "+4" in the column indicates the operation for rotating the index table 22 clockwise by four segments, i.e. 180°. The abscissa axis is a time axis, in which numeral 1-22 in FIGS. 10A-10B merely indicate the processing order, and the time axis is not sectioned at constant time intervals.

A unit of the time interval will be referred to as a time sequence hereinafter.

What is described in the boxes of FIGS. 10A and 10B are operations carried out at the corresponding working station (ST1-ST8) of the index table 22 in the subject time sequence.

In the initial state, a hand for holding a motor is mounted at an end of the first arm robot 21a, and a screw-clamping tool is installed at an end of the second arm robot 21b. The first arm robot 21a mainly performs the assembly at station 3, while the second arm robot 21b mainly performs the assembly.

Time Sequence 1

The first arm robot 21a takes the motor 11 from the feed section A and provides the same to the positioning tool 3 in the working station ST3. The motor holding hand is detached from the end of the first arm robot 21a, and is accommodated in the tool container 23 at a position P1. Then, a hand for holding a base 13 is mounted to the first arm robot 21a from a position P2, so that the first arm robot 21a takes the base 13 from the feed tray section B to mount the same to the motor 11 at the working station ST3. Then, the base-holding hand is detached and accommodated in the tool container 23 at the position P2. Thereafter, the motor holding hand is attached again to the first arm robot 21a from the position P1.

Meanwhile, the second arm robot 21b performs nothing.

Time Sequence 2

The index table 22 is rotated 180° (four segments) in a clockwise direction. Then, the motor 11 and the base 13 assembled in the working station ST3 are moved to the working station ST7.

Time Sequence 3

The first arm robot 21a, using the motor holding hand mounted at its end, picks up and moves the motor 11 from the tray section A to the positioning tool 3 in the working station ST3. The motor holding hand is detached from the first arm robot 21a to be accommodated in the tool container 23 at the position P1, and the first arm robot 21a again takes the base holding hand from the tool container 23 at the position P1. The base 13 is picked up from the tray section B and assembled with the motor 11 in the working station ST3. Subsequently, the motor holding hand is released from the first arm robot 21a and accommodated in the tool container 23 at the position P1. A 90° reversing (rotating) hand is then attached to the first arm robot 21a from a position P3.

The second arm robot 21b clamps (secures) the base 13 to the motor 11, assembled together in the working station ST3 in the time sequence 1, with two screws 14 by a screw clamping tool in the working station ST7.

Time Sequence 4

The index table 22 is rotated 180° in the forward direction.

Time Sequence 5

In the working station ST3, the processing device 30 inspects the height of the screws of the motor 11 clamped in the working station ST7.

The first arm robot 21a rotates the base unit 15 by 90° in a reverse direction with use of the 90° reversing hand.

The second arm robot 21b clamps (secures) the base 13 to the motor 11 assembled in the working station ST3 in the Time sequence 3 with two screws 14 by the clamping tool in the working station ST7. Thereafter, the second arm robot 21b detaches the clamping tool and stores the same in the tool container 23 at the position P17. The second arm robot 21b in turn takes a grease applying tool from a position P8.

Time Sequence 6

The index table 22 is rotated 180° clockwise.

Time Sequence 7

The processing device 30 inspects, in the working station ST3, the height of the screws 14 of the motor 11 in the working station ST7.

Figure 7B:
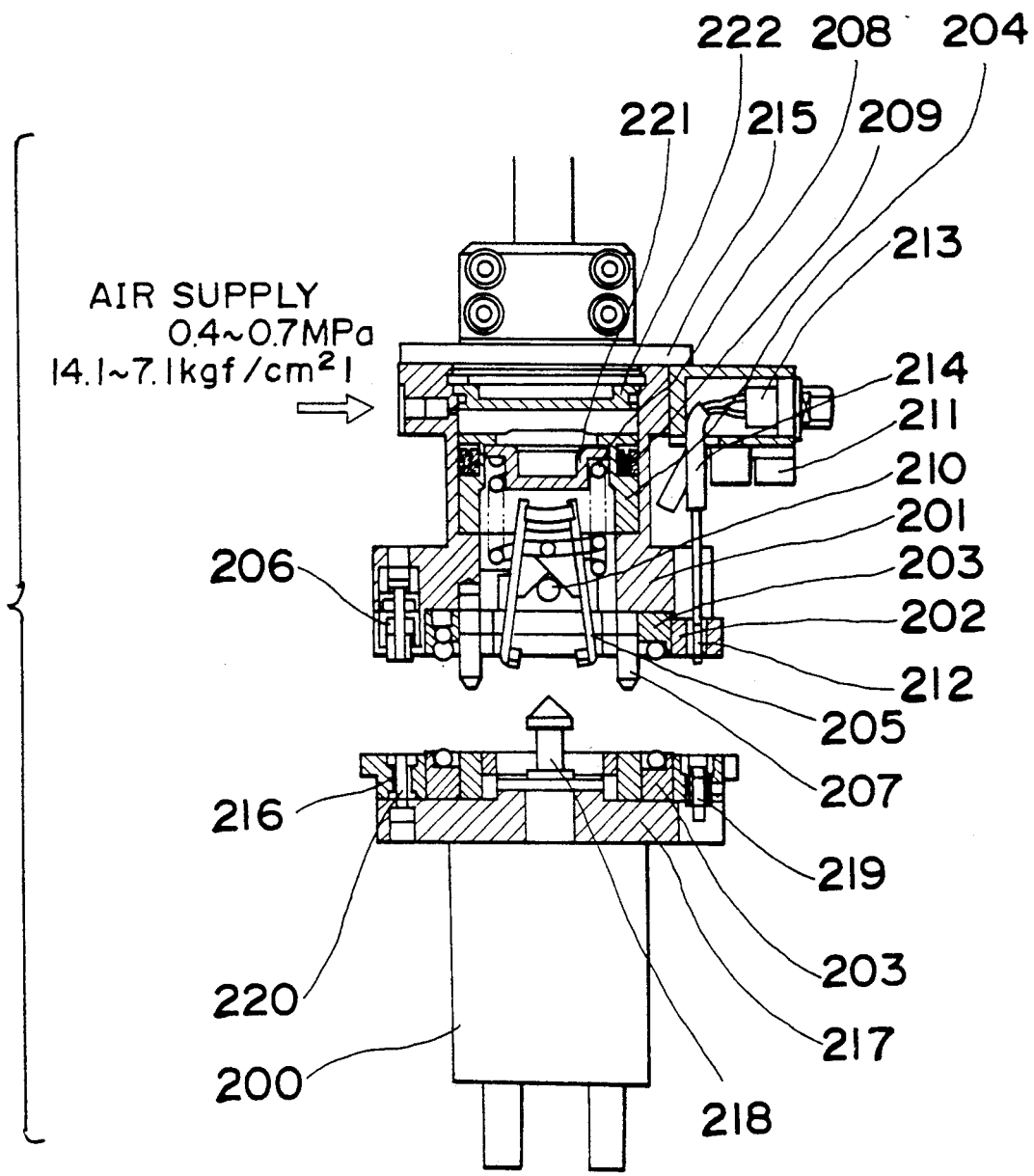
FIG. 7B is a side sectional view of a chucking hand and a tool removably attached to the hand.

The first arm robot 21a rotates the inspected motor 11 by 90° in a reverse direction on the working station ST3, then releases the 90° reversing hand to be accommodated in the tool container 23 at the position P3. In place of the reversing hand, a holding hand for the first and third gears 16a, 16c is moved from a position P4 and mounted to the first arm robot 21a. The holding hand for the first and third gears 16a, 16c has two hands as shown in FIG. 7A which are switched to be used. FIG. 7B shows an example of a chucking hand attached to the arm robot 21. As shown in FIG. 7B, the chucking hand is removably connected with a tool 200 for assembly by supplying air to the chucking hand. In FIG. 7B, reference numeral 200 denotes an assembly tool, 201 a body, 202 an insulating ring, 203 a coupling, 204 a piston, 205 a lever for removably engaging with a hook 218, 206 a check valve assembly, 207 a pilot pin, 208 a clamp spring, 209 a packing, 210 a parallel pin, 211 a multi-tube holder, 212 a contact probe, 213 a D-subconnector assembly, 214 a cable, 215 a robot adapter, 216 a connecting base, 217 a plate, 219 a contact block assembly, 220 a passage packing, 221 a bearing, and 222 a cap.

In the working station ST7, the second arm robot 21b uses the grease applying tool to apply grease to pins 12a, 12b, 12c on the base 13 which has been reversed 90° on the working station ST3.

Time Sequence 8

The index table 22 is rotated 180° in the forward direction.

Time Sequence 9

The first arm robot 21a uses the holding hand to take out the first gear 16a, in the working station ST3, from the taping cassette 29a and mounts the first gear 16a onto the pin 12a on the base 13 to which grease has been applied in the working station ST7. Then, after switching the hand, the first arm robot 21a uses the switched holding hand to pick out the third gear 16c from the taping cassette 29c, and mounts the third gear 16c onto the pin 12c on the base 13 to which grease has been applied in the working station ST7. The holding hand is switched again for the next holding operation.

In the working station ST7, the second arm robot 21b uses the grease applying tool to apply grease to the pins 12a, 12b, 12c on the base 13 which has been reversed 90° on the working station ST3.

Then, after the grease applying tool is detached and accommodated in the tool container 23 at the position P8, a hand for holding the second gear 16b is mounted to the second arm robot 21b from a position P5.

Time Sequence 10

The index table 22 is rotated 180° in the forward direction.

Time Sequence 11

In the working station ST3, the first arm robot 21a uses the holding hand to take the first gear 16a from the taping cassette 29a and mounts the first gear 16a onto the pin 12a on the base 13 to which grease has been applied in the working station ST7. Then, after switching the holding hand, the first arm robot 21a uses the holding hand to take out the third gear 16c from the taping cassette 29c and mounts the third gear 16c onto the pin 12c on the base 13 to which grease has been applied in the working station ST7. The holding hand for the first and third gears 16a, 16c is detached from the first arm robot 21a, and stored in the tool container 23 at the position P4. Then, the motor holding hand is mounted to the first arm robot 21a from the position P1.

On the other hand, the second arm robot 21b uses the holding hand to take out the second gear 16b form the taping cassette 29b and mounts the second gear 16b in the working station ST7 onto the pin 12b on the base 13 to which grease has been applied in the working station ST7.

Time Sequence 12

The index table 22 is rotated in the forward direction by 180°.

Time Sequence 13

The processing device 30 takes the washer 17 and mounts the washer 17 on the pin 12b on the base 13 in order to prevent the first to third gears 16a, 16b, 16c from being detached from the base 13 in the working station ST3.

The first arm robot 21a does not function.

Then, the processing device 30 inspects the height of the washer 17 to determine if the washer is properly mounted on the pin 12b.

In the working station ST7, the second arm robot 21b uses the holding hand to take the second gear 16b from the taping cassette 29b and mounts the second gear 16b onto the pin 12b on the base 13 to which grease has been applied in the working station ST7. The second arm robot 21b releases the holding hand for the second gear and stores it in the tool container 23 at the position P5. Then, the grease applying tool is mounted to the second arm robot 21b from the position P8.

Time Sequence 14

The index table 22 is rotated 180° in the forward direction.

Time Sequence 15

The processing device 30 takes the washer 17 and mounts it on the pin 12b on the base 13 so as to prevent detachment of the first to third gears 16a, 16b, 16c from the base 13, in the working station ST3.

The first arm robot 21a does not function.

The processing device 30 inspects the height of the washer 17 on the working station ST3 to detect whether the washer 17 is properly mounted on the pin 12b.

The second arm robot 21b applied grease to a part of the base 13 where the gears 16a, 16b 16c are meshed with each other, in the working station ST7. Then, after the grease applying tool is removed from the second arm robot 21b and accommodated in the position P8, a hand for holding a completed product is mounted to the second arm robot 21b from a position P6, so that the motor unit 18 completed on the working station ST7 is held and stored in the finished product container 31. The holding hand is then removed and accommodated in the tool container 23 at the position P6. The grease applying tool is mounted from the position P8.

Time Sequence 16

The index table 22 is rotated 180° in the forward direction.

Time Sequence 17

The second arm robot 21a takes the motor 11 from the tray section A to the positioning tool 3 at the working station ST3. After the motor holding hand at the end of the first arm robot 21a is detached and housed in the tool container 23 at the position P1, the base holding hand is attached to the first arm robot 21a. The first arm robot 21a receives the base 13 from the tray section B and assembles the base 13 with the motor 11 at the working station ST3. The base holding hand is housed in the tool container 23 at the position P2 and the motor holding hand is installed on the first arm robot 21a from the position P1.

The second arm robot 21b applied grease in the working station ST7 to a part of the base 13 onto which the washer 17 is mounted in the working station ST3 and where the gears are meshed with each other. The grease applying tool is detached and stored in the tool container 23 at the position P8. A finished product holding hand is mounted from the position P6. Accordingly, the finished motor unit 18 on the working station ST7 is held and kept in the finished product container 31. Further, the finished product holding hand is separated from the second arm robot 21b and accommodated in the tool container 23 at the position P6. A screw clamping tool for the second arm robot 21b is taken from the position P7.

In the manner described above, two motor units are completed.

A component assembling apparatus according to a second embodiment of the present invention will be described below.

The second embodiment is an application of the aforementioned first embodiment, whereby the number of times that the tools and hands are exchanged can be reduced.

In other words, although each of the first and second arm robots 21a, 21b uses one working station ST in the first embodiment, every two working stations are allotted to each of the robots in the second embodiment.

Figure 11A:
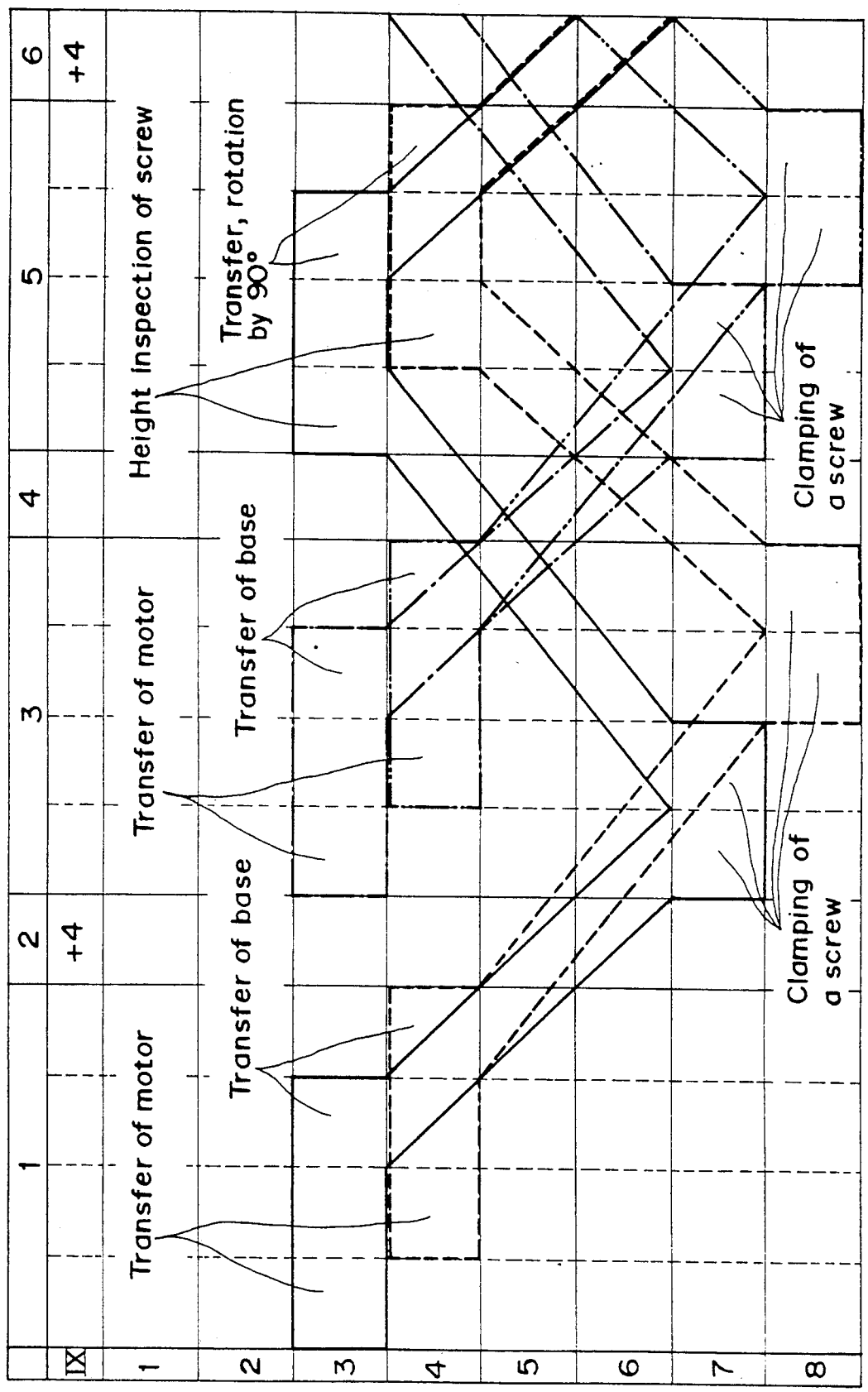
FIGS. 11A–11C are time charts showing an operation carried out in the working stations of the index table according to a second embodiment of the present invention.
Figure 11B:
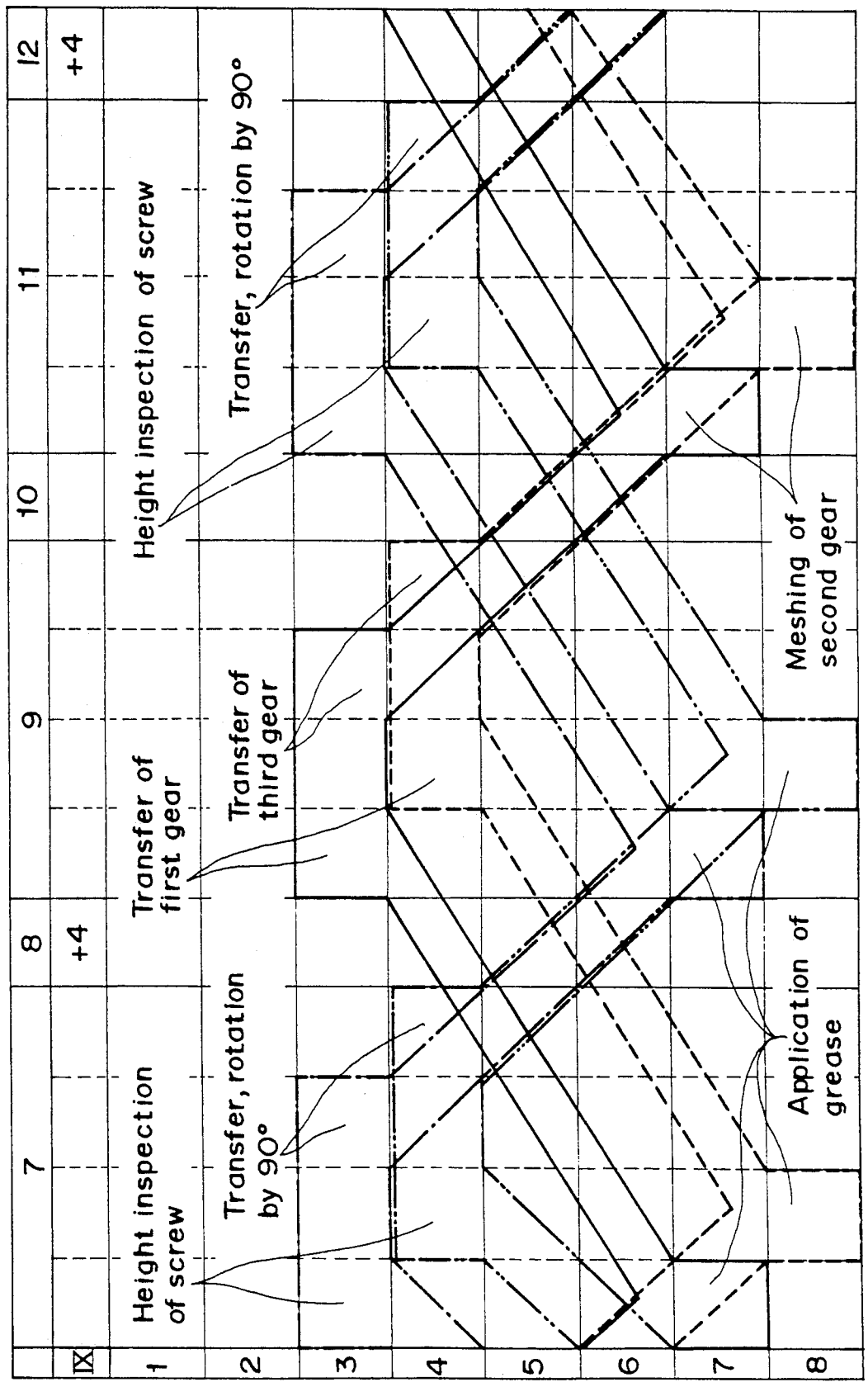
Figure 11C:
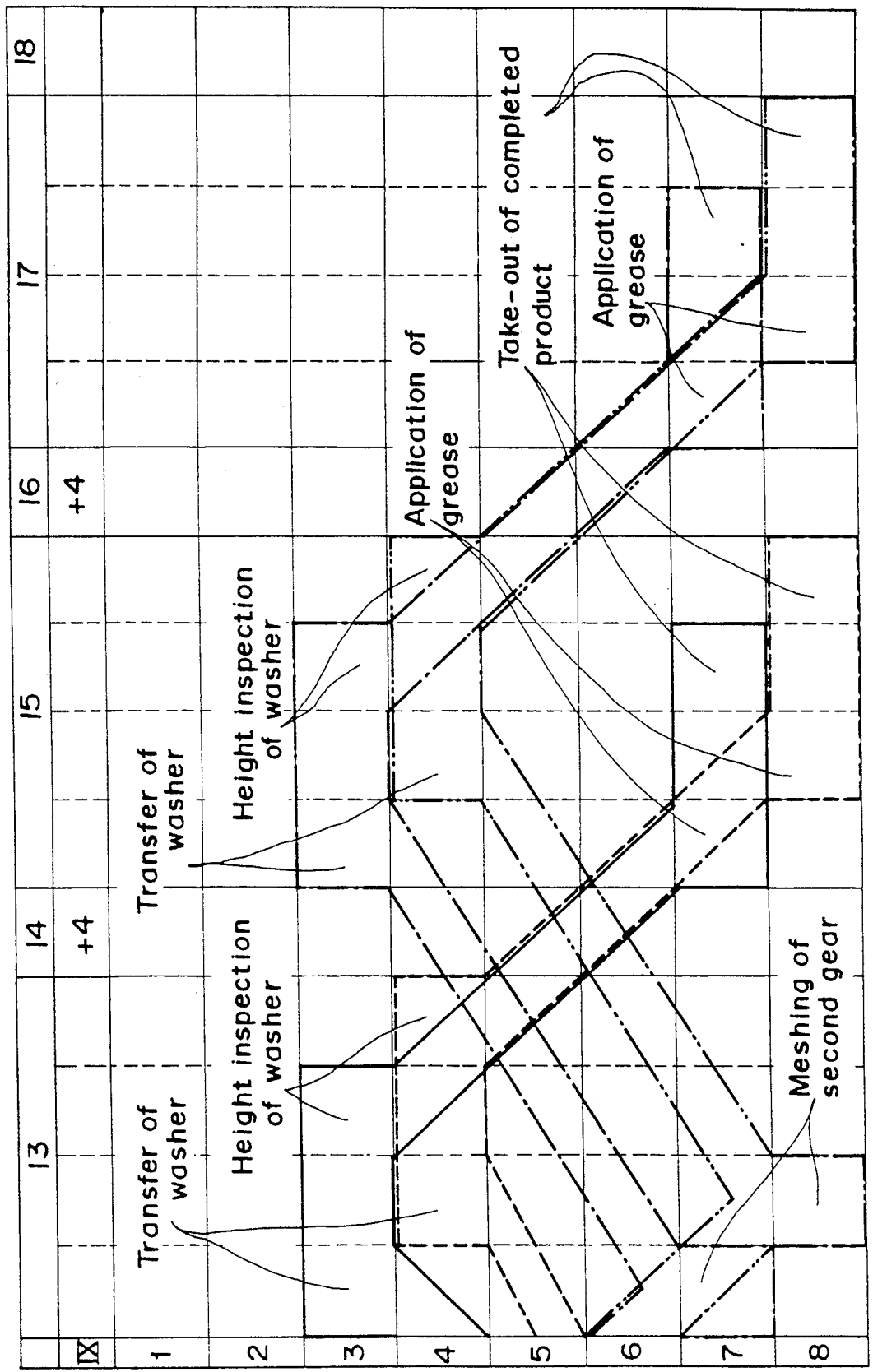

More specifically, the working stations ST3, ST4 and the working stations ST7, ST8 are assigned to the first and second arm robots 21a and 21b, respectively. Each robot is thus capable of processing two objects at one time. FIGS. 11A-11C are assembling time charts for a reference. The assembling process carried out at one set of the working stations ST3 and ST7 as shown in FIGS. 10A-10B in the first embodiment is performed at each of two sets of the working stations ST3 and ST7 and the working stations ST4 and ST8 as shown in FIGS. 11A-11C in the second embodiment.

According to a third embodiment of the present invention, two robots cooperate in assembling a product more positively. The third embodiment will now be described below.

For instance, while the base 13 is gripped by the first arm robot 21a in the working station ST1, the base 13 is secured to the motor 11 by the second arm robot 21b.

The operation will be discussed in terms of time sequences, similar to the foregoing embodiment.

FIGS. 12A-12E are assembling time charges illustrating assembly of a product by collaboration of the two robots.

In the initial state, the motor holding hand is mounted to an end of the first arm robot 21a and the screw clamping tool is attached to an end of the second arm robot 21b.

<Time Sequence 1>

In the working station ST1, the first arm robot 21a removes the motor 11 from the tray section A, and mounts the motor 11 to the positioning tool 3 in the working station ST1. The motor holding hand at the end of the first arm robot 21a is detached and accommodated in the tool container 23 at the position P1. The base holding hand is attached to the first arm robot 21a from the position P2. The first arm robot 21a takes the base 13 from the tray section B and assembles the base 13 with the motor 11 in the working station ST1.

In the working station ST1, the arm robots 21a and 21b cooperate with each other. That is, while the first arm robot 21a holds the base 13, the second arm robot 21b clamps (secures) the motor 11 with the screw 14 by means of the screw clamping tool.

<Time Sequence 2>

The index table 22 is rotated 90° (Two segments) in the forward direction (in the clockwise direction). The base unit 15 assembled in the working station ST1 is moved to the working station ST3.

<Time Sequence 3>

In the working station ST1, the first arm robot 21a removes and feeds the motor 11 from the tray section A to the positioning tool 3. Thereafter, the motor holding hand attached at the end of the first arm robot 21a is detached and accommodated in the tool container 23 at the position P1. The first arm robot 21a further uses the base holding hand to take the base 13 from the tray section B to the position P2, and assembles the base 13 with the motor 11 in the working station ST1.

While the first arm robot 21a holds the base 13 in the working station ST1, the second arm robot 21b clamps (secures) the motor 11 with the screws 14 by means of the screw clamping tool. In other words, the second arm robot 21b works in cooperation with the first arm robot 21a. Then, the first arm robot 21a detaches and accommodates the base holding hand in the tool container 23 at the position P2. The 90° reversing hand is attached to the first arm robot 21a from the position P3.

In the working station ST3, the processing device 30 is adapted to performed non-assembling operations such as inspecting the height of the screws 14 of the motor 11 by the height inspecting device.

Also in the working station ST3, the first arm robot 21a uses the 90° reversing hand to reverse the base unit 15 by 90°. Then, the 90° reversing hand is removed from the first arm robot 21a and housed in the tool container 23 at the position P3. The base holding hand is picked up and mounted to the first arm robot 21a from the position P2.

<Time Sequence 4>

The index table 22 is rotated 90° in the forward direction.

<Time Sequence 5>

In the working station ST1, the first arm robot 21a takes the motor 11 from the tray section A and provides the same to the positioning tool 3 in the station ST1. The motor holding hand at the end of the first arm robot 21a is detached and stored in the tool container 23 at the position P1. The base holding hand selected from the position P2 is attached to the first arm robot 21a. The first arm robot 21a takes the base 13 from the tray section B, and then assembles the base 13 with the motor 11.

In cooperation between the first arm robots 21a and 21b, when the first arm robot 21a is holding the base 13, the second arm robot 21b clamps (secures) the motor 11 with the screws 14 by the screw clamping tool. The first arm robot 21a, releasing the base holding hand and storing it in the tool container 23 at the position P2, picks up the 90° reversing hand from the position P3. On the other hand, the second arm robot 21b is, after detaching and accommodating the screw clamping tool in the tool container 23 at the position P7, equipped with the grease applying tool from the position P8.

In the working station ST3, the processing device 30 inspects, by means of the inspecting device, the height of the screws 14 of the motor 11 clamped in the working station ST1.

The first arm robot 21a uses the 90° reversing hand to rotate the base unit 15 by 90° in the reverse direction.

Using the grease applying tool, the second arm robot 21b applies grease to the pin 12b on the base 13 in the working station ST5 which has been reversed 90° in the working station ST3.

Thereafter, the first arm robot 21a detaches the 90° reversing hand and stores it in the tool container 23 at the position P3, and takes the holding hand for the first and third gears 16a, 16c from the position P4. In the working station ST3, the first arm robot 21a removes the first gear 16a from the taping cassette 29a, and mounts the first gear 16a onto the pin 12a on the base 13 to which grease has been applied in the working station ST5.

After switching the hand, the first arm robot 21a takes the third gear 16c from the taping cassette 29c to mount the same onto the pin 12c on the base 13 to which grease has been applied. The first arm robot 21a switches the hand again.

Then, the holding hand for the first and third gears 16a, 16c is detached from the first arm robot 21a and accommodated in the tool container 23 at the position P4. Instead, the motor holding hand is attached to the first arm robot 21a from the position P1.

<Time Sequence 6>

The index table 22 is rotated 90° in the forward direction.

<Time Sequence 7>

In the working station ST1, the first arm robot 21a takes the motor 11 from the tray section A and mounts the same to the positioning tool 3 in the working station ST1. Thereafter, the attached motor holding hand is removed and put in the tool container 23 at the position P1. The base holding hand is then attached to the first arm robot 21a. The first arm robot 21a takes the base 13 from the tray section B and assembles the base 13 with the motor 11.

In the same working station ST1, the second arm robot 21b uses the screw clamping tool to clamp the motor 11 with the screws 14 while the first arm robot 21a holds the base 13. That is, cooperative work is carried out. Thereafter, the base holding hand of the first arm robot 21a is detached and stored in the tool container 23 at the position P2. The 90° reversing hand is attached to the first arm robot 21a from the position P3.

In the working station ST3, the processing device 30 inspects the height of the screws 14 of the motor 11 clamped in the working station ST1 by means of the inspecting device. The first arm robot 21a uses the 90° reversing hand to rotate the base unit 15 by 90°.

In the working station ST5, the second arm robot 21b uses there grease applying tool to apply grease to the pin 12b on the base 13 which has been reversed 90° in the working station ST3. The grease applying tool is removed and the holding hand for the second gear is mounted to the second arm robot 21b. Meanwhile, the first arm robot 21a releases and accommodates the 90° reversing hand in the tool container 23 at the position P3. The holding hand for the first and third gears 16a, 16c is mounted to the first arm robot 21a from the position P4. The first arm robot 21a takes the first gear 16a and mounts the first gear 16a the pin 12a at the working station ST3 on the base 13 to which grease has been applied in the working station ST5.

Then, the first arm robot 21a takes the third gear 16c from the taping cassette 29c after switching the holding hand, and mounts the third gear 16c onto the pin 12c on the base 13 to which grease has been applied on the working station ST7. The hand is switched again.

The holding hand for the first and third gears 16a, 16c is detached from the first arm robot 21a and accommodated in the tool container 23 at the position P4. And, the motor holding hand is picked up from the position P1 by the first arm robot 21a.

In the working station ST7, the second arm robot 21b removes the second gear 16b from the taping cassette 29b to mount the second gear 16b onto the pin 12b on the base 13 to which grease has been applied in the working station ST7. The holding hand for the second gear is removed form the second arm robot 21b and accommodated in the tool container 23 at the position P5. The second arm robot 21b is provided with the grease applying tool from the position P8.

The processing device 30 removes the washer 17 and mounts the washer 17 onto the base 13 to prevent detachment of the first to third gears 16a, 16b, 16c from the base 13. Moreover, the processing device 30 inspects whether the washer 17 is properly mounted on the pin 12b.

The second arm robot 21b applies grease to a part of the base 13 where the gears are meshed with each other. Then, the grease applying tool is removed from the second arm robot 21b which is in turn provided with the finished product holding hand, thereby holding the completed motor unit 18 on the working station ST7. The completed product is stored in the finished product container 31.

The above procedure is repeated.

Figure 8A:
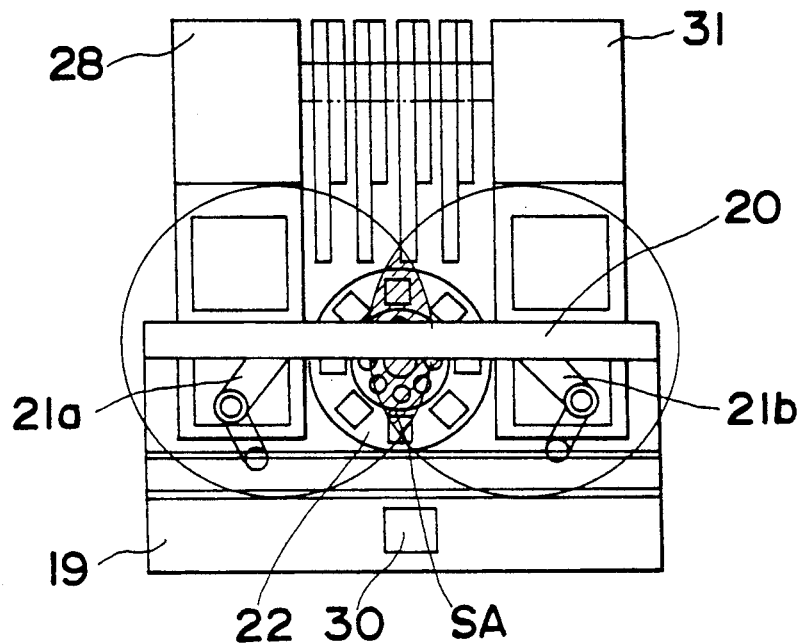
FIGS. 8A and 8B are plan views of the component assembling apparatus of FIG. 4 with the distance between arm robots changed.
Figure 8B:
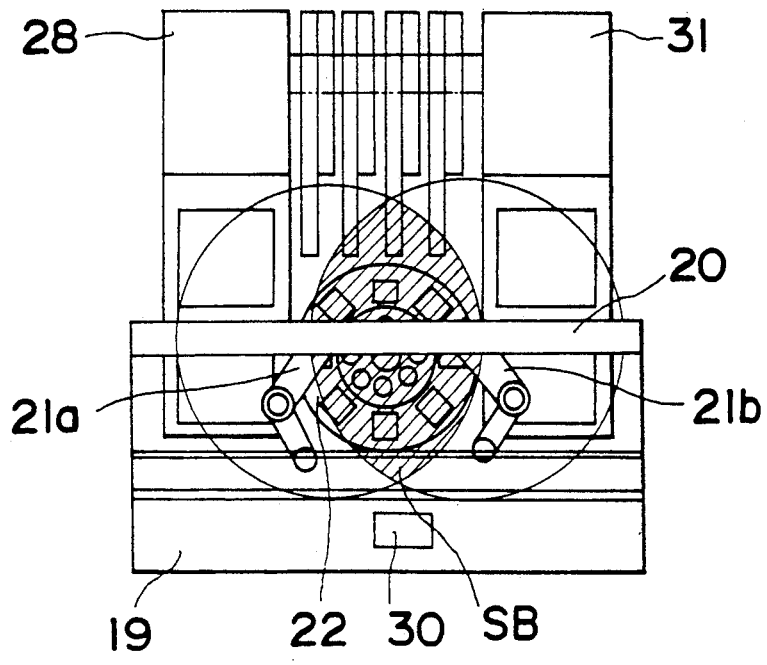

FIGS. 8A and 8B show a modification of the component assembling apparatus of the present invention. In FIGS. 8A and 8B, the distance between the arm robots which are suspended by the running lane is narrowed, so that the movable areas of the arm robots in the plane of the index table overlap to a greater extent and, therefore, the area served by the two arm robots is accordingly enlarged. In comparing FIGS. 8A and 8B, it can be seen that when the distance between the arm robots 21a and 21b is reduced, the collaborative working area on the index table 22 is widened from SA to SB. The collaborative working area can be adjusted by changing the mounting distance of a plurality of arm robots, and thus it is possible to obtain the optimum circumstances for each operation.

Figure 9:
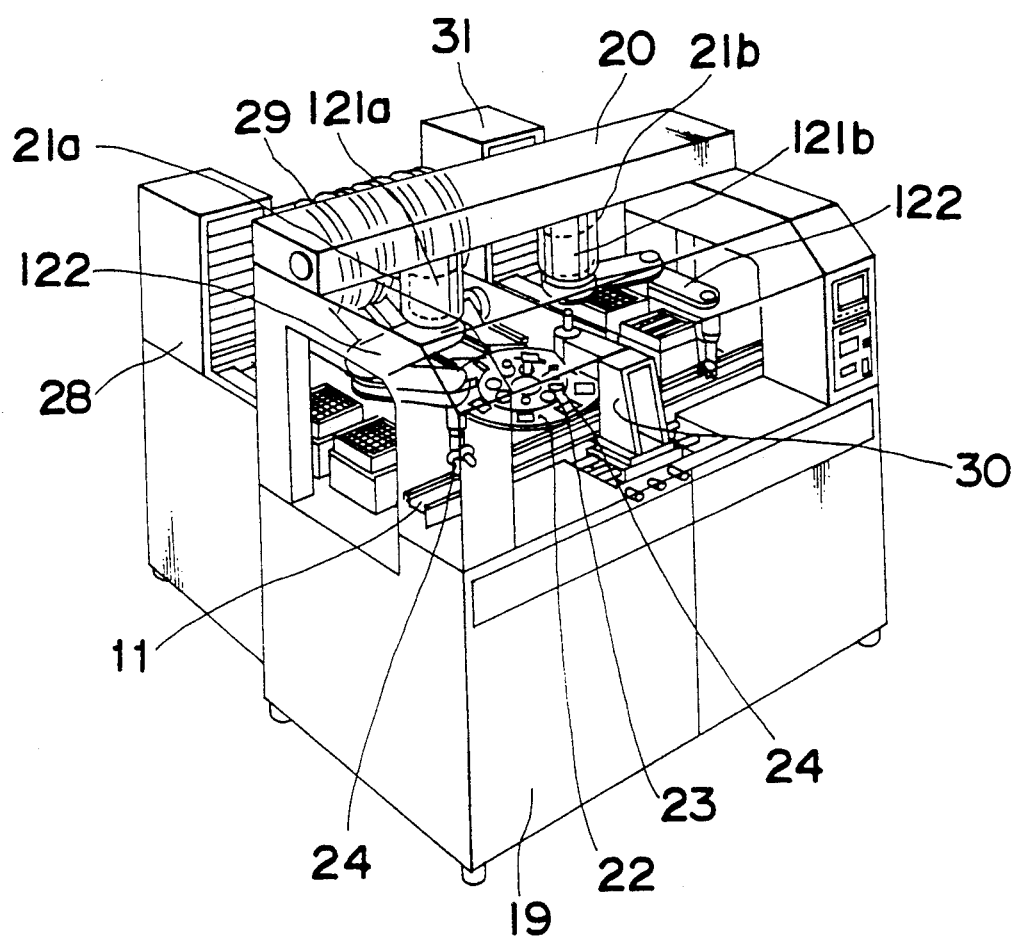
FIG. 9 is a perspective view showing the overall appearance of a modified component assembling apparatus of the present invention.

Further, as shown in FIG. 9, if the tool transferring device 11 for transferring the positioning tool 3 is coupled to the component assembling apparatus according to one embodiment of the present invention and many of these component assembling apparatus coupled with the tool transferring device are connected with each other, it becomes possible to expand the production line to obtain a mass production system.

In addition to the above-described advantages of the present embodiment, since the index table 22 is made hollow at the central part 25 around the rotary shaft thereof, the tool container 23 is allowed to sink below the surface of the index table 22 by being lowered by the cylinder 26 except when the tool is to be mounted or removed, thereby controlling the interference of the arm robots 21a, 21b with the tool 24. On the other hand, when the tool is to be attached or detached, the tool container 23 is raised by the cylinder 26 to bring the tool container 23 above the surface of the index table 22. Accordingly, the arm robots, 21a, 21b can be rid of wasteful motion in order to avoid contact with the tool 24.

Moreover, since the tool container 23 is provided at the center of the index table 22, it saves space. As the index table 22 is made hollow at the axial center thereof and the tool container 23 is put in the hollow part 25, a larger space is saved.

Since a plurality of arms are suspended in the embodiment, it contributes to securing of a larger space in the periphery of the index table. The space can be utilized for additional functions.

Since the stations are moved by the index table 22 in a circle, it is possible to make the area for moving the arm robots 21a and 21b small. Thus, it is also possible to make the arrangement area of the assembly tools 3 small.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A component assembling apparatus comprising:
   an intermittently rotatable index table for holding a plurality of positioning tools for positioning components to be assembled, the positioning tools being arranged on the table;
   an index table driving means for intermittently rotating the index table;
   a component feeding device for individually feeding the components and individually holding the components, respectively, at a removal position of the device;
   a tool container for storing a plurality of assembling tools for assembling the components;
   a first arm robot for removably mounting one of the assembling tools at its end, for moving one of the components from the removal position of the component feeding device to a predetermined position of the positioning tool on the table, and for assembling the component moved to the predetermined position of the positioning tool by said first arm robot; and
   a first arm robot driving means for actuating said first arm robot.

2. The component assembling apparatus as defined in claim 1, wherein the tool container is provided at a center of the index table.

3. The component assembling apparatus as defined in claim 2, further comprising:
   a second arm robot for removably mounting one of the assembling tools at its end, for moving one of the components from the removal position of the component feeding device to a predetermined position of the positioning tool on the table, and for assembling the component moved to the predetermined position of the positioning tool by said second arm robot; and
   a second arm robot driving means for actuating said second arm robot.

4. The component assembling apparatus as defined in claim 3, wherein said first and second arm robots are arranged to have reaches which overlap one another such that said first and second arm robots can cooperate with each other.

5. The component assembling apparatus as defined in claim 3, wherein said first and second arm robots are installed to be shifted from a rotational center of the index table towards the component feeding device.

6. The component assembling apparatus as defined in claim 2, wherein
the index table has a hollow part at its center; and
a tool container driving means is provided for vertically moving the tool container in said hollow part of the index table.

7. The component assembling apparatus as defined in claim 1, further comprising an arm robot holding member for holding said first arm robot.

8. The component assembling apparatus as defined in claim 1, the assembling tools include a processing device for performing non-assembling operations.

9. The component assembling apparatus as defined in claim 1, further comprising a transferring means for transferring an assembled component.

10. A component assembling apparatus comprising:
an intermittently rotatable index table for holding a plurality of positioning tools for positioning components to be assembled, the positioning tools being arranged on the table, and the table having a hollow part at its center;
an index table driving means for intermittently rotating the index table;
a component feeding device for individually feeding the components and individually holding the components, respectively, at a removal position of the device;
a tool container for storing a plurality of assembling tools for assembling the components, the tool container being provided at a center of the index table;
a tool container driving means for vertically moving the tool container in said hollow part of the index table;
a first arm robot for removably mounting one of the assembling tools at its end, for moving one of the components from the removal position of the component feeding device to a predetermined position of the positioning tool on the table, and for assembling the component moved to the predetermined position of the positioning tool by said first arm robot;
a first arm robot driving means for actuating the first arm robot;
a second arm robot for removably mounting one of the assembling tools at its end, for moving one of the components from the removal position of the component feeding device to a predetermined position of the positioning tool on the table, and for assembling the component moved to the predetermined position of the positioning tool by said second arm robot, the first and second arm robots being arranged to cooperate with each other; and
a second arm robot driving means for actuating the second arm robot.

11. The component assembling apparatus as defined in claim 10, wherein the first and second arm robots are installed to be shifted from a rotational center of the index table towards the component feeding device.

12. The component assembling apparatus as defined in claim 10, further comprising an arm robot holding member for suspending said first and second arm robots.

13. The component assembling apparatus as defined in claim 10, wherein the assembling tools include a processing device for performing non-assembling operations.

14. The component assembling apparatus as defined in claim 10, further comprising a transferring means for transferring an assembled component.

15. A component assembling apparatus comprising:
an intermittently rotatable index table for holding a plurality of positioning tools for positioning components to be assembled, the positioning tools being arranged on the table;
an index table driving means for intermittently rotating the index table;
a component feeding device for individually feeding the components and individually holding the components, respectively at a removal position of the device;
a first arm robot for removably mounting one of a plurality of assembling tools at its end, for moving one of the components from the removal position of the component feeding device to a predetermined position of the positioning tool on the table, and for assembling the component moved to the predetermined position of the positioning tool by said first arm robot; and
a first arm robot driving means for actuating said first arm robot.

16. The component assembling apparatus as defined in claim 15, further comprising:
a second arm robot for removably mounting one of the plurality of assembling tools at its end, for moving one of the components from the removal position of the component feeding device to a predetermined position of the positioning tool on the table, and for assembling the component moved to the predetermined position of the positioning tool by said second arm robot; and
a second arm robot driving means for actuating the second arm robot.

17. The component assembling apparatus as defined in claim 15, wherein said first and second arm robots are arranged to have reaches which overlap one another such that said first and second arm robots can cooperate with each other.

* * * * *